US012802390B2

(12) United States Patent
Zeng et al.

(10) Patent No.: US 12,802,390 B2
(45) Date of Patent: Nov. 17, 2026

(54) GROUND OBJECT SEGMENTATION METHOD BASED ON RESIDUAL MODULE AND ATTENTION MECHANISM, AND RELATED APPARATUS

(71) Applicant: Chengdu University of Technology, Chengdu (CN)

(72) Inventors: Tao Zeng, Chengdu City (CN); Zeming Pu, Chengdu City (CN); Yanmin Fu, Chengdu City (CN); Shipeng Lin, Chengdu City (CN); Peijie Liu, Chengdu City (CN); Daobin Wu, Chengdu City (CN); Junjie He, Chengdu City (CN)

(73) Assignee: Chengdu University of Technology, Chengdu City (CN)

( * ) Notice: Subject to any disclaimer, the term of this patent is extended or adjusted under 35 U.S.C. 154(b) by 303 days.

(21) Appl. No.: 18/650,426

(22) Filed: Apr. 30, 2024

(65) Prior Publication Data

US 2025/0299462 A1 Sep. 25, 2025

(30) Foreign Application Priority Data

Mar. 21, 2024 (CN) ........................ 202410326764.3

(51) Int. Cl.
*G06V 10/26* (2022.01)
*G06N 3/0455* (2023.01)
(Continued)

(52) U.S. Cl.
CPC ............ *G06V 10/26* (2022.01); *G06V 10/774* (2022.01); *G06V 10/776* (2022.01); *G06V 10/82* (2022.01); *G06V 20/176* (2022.01)

(58) Field of Classification Search
CPC .... G06V 10/26; G06V 10/774; G06V 10/776; G06V 10/82; G06V 20/176;
(Continued)

(56) References Cited

FOREIGN PATENT DOCUMENTS

CN 117495871 A * 2/2024 ............... G06T 7/10

OTHER PUBLICATIONS

Li, Chaohui, et al. "Attention residual U-Net for building segmentation in aerial images."2021 IEEE International Geoscience and Remote Sensing Symposium IGARSS. IEEE, 2021. (Year: 2021).*
(Continued)

*Primary Examiner* — Stephen R Koziol
*Assistant Examiner* — Joshua Chen
(74) *Attorney, Agent, or Firm* — Fresh IP PLC; Michael Anderson; Aubrey Y. Chen

(57) ABSTRACT

The present disclosure provides a ground object segmentation method based on a residual module and an attention mechanism, and a related apparatus, and relates to the field of remote sensing (RS) ground object segmentation technologies. The method includes the following steps: obtaining a to-be-segmented RS image; and inputting the to-be-segmented RS image into a trained ground object segmentation model to obtain a ground object segmentation result, where the ground object segmentation model is a network model obtained based on a U-Net neural network and with reference to the residual module and an attention module. In the present disclosure, a U-Net model with reference to a residual network structure and the attention mechanism is used.

12 Claims, 6 Drawing Sheets

(51) Int. Cl.

| | |
|---|---|
| ***G06N 3/0464*** | (2023.01) |
| ***G06V 10/25*** | (2022.01) |
| ***G06V 10/774*** | (2022.01) |
| ***G06V 10/776*** | (2022.01) |
| ***G06V 10/82*** | (2022.01) |
| ***G06V 20/10*** | (2022.01) |

(58) Field of Classification Search

CPC ...... G06V 10/267; G06V 10/25; G06V 20/10; G06N 3/0455; G06N 3/0464; G06N 3/08

See application file for complete search history.

(56) References Cited

OTHER PUBLICATIONS

Punn, Narinder Singh, and Sonali Agarwal. "RCA-IUnet: a residual cross-spatial attention-guided inception U-Net model for tumor segmentation in breast ultrasound imaging." Machine Vision and Applications 33.2 (2022): 27. (Year: 2022).*

Wang, Mingjia, YuCui Chen, and Baozhu Qi. "Residual UNet with spatial and channel attention for automatic magnetic resonance image segmentation of rectal cancer." Multimedia Tools and Applications 81.30 (2022): 43821-43835. (Year: 2022).*

* cited by examiner

GROUND OBJECT SEGMENTATION METHOD BASED ON RESIDUAL MODULE AND ATTENTION MECHANISM, AND RELATED APPARATUS

CROSS REFERENCE TO RELATED APPLICATION

This patent application claims the benefit and priority of Chinese Patent Application No. 2024103267643, filed with the China National Intellectual Property Administration on Mar. 21, 2024, the disclosure of which is incorporated by reference herein in its entirety as part of the present application.

TECHNICAL FIELD

The present disclosure relates to the field of remote sensing (RS) ground object segmentation technologies, and in particular, to a ground object segmentation method based on a residual module and an attention mechanism, and a related apparatus.

BACKGROUND

In recent years, RS technologies and computer technologies have developed rapidly. Many researchers are dedicated to improving image processing efficiency by using machine learning algorithms. With continuous improvement of computer hardware performance, deep learning (DL) technologies that need to be supported by powerful computing power have developed rapidly in the field of computer vision, and have played a great role in monitoring and recognition such as RS, self-driving, and medical image processing.

A DL algorithm for image processing is represented by a deep convolutional neural network (DCNN). In recent years, neural network models for various problems are rapidly derived. A fully convolutional neural network (FCN) and a U-Net model are widely used in the image segmentation field, and are mainstream networks currently used. U-Net was first used for medical image segmentation tasks, and is famous for a concise structure and excellent performance. Therefore, different improvements are made according to different problems, for example, there are excellent models such as UNet++, Attention U-Net, and U2-Net.

Introducing a DL-based image semantic segmentation technology into the RS field and automatically performing RS interpretation by using a computer is an inevitable choice and there is also a great challenge. However, complexity of ground object information in an RS image easily leads to confusion, and there are problems such as a blurred boundary between ground objects and low contrast. A simple convolution operation extracts a global feature of an image, but lacks spatial correlation information, and increases a weight of a redundant pixel. This affects recognition precision of a target ground type.

SUMMARY

The present disclosure aims to provide a ground object segmentation method based on a residual module and an attention mechanism, and a related apparatus, to improve precision of performing ground object segmentation on an RS image.

To achieve the above objective, the present disclosure provides the following technical solutions.

According to one aspect, the present disclosure provides a ground object segmentation method based on a residual module and an attention mechanism, including the following steps:

obtaining a to-be-segmented RS image, where the to-be-segmented RS image includes multiple buildings and ground areas; and inputting the to-be-segmented RS image into a trained ground object segmentation model to obtain a ground object segmentation result, where the ground object segmentation result includes a building segmentation result, and the ground object segmentation model is a network model obtained based on a U-Net neural network and with reference to the residual module and an attention module.

Optionally, the method further includes the following steps:

obtaining a training dataset, where the training dataset includes multiple training samples, and the training sample includes a training RS image and a corresponding building segmentation label;

constructing the ground object segmentation model based on the U-Net neural network and with reference to the residual module and the attention module; and training the ground object segmentation model by using the training dataset to obtain a trained building segmentation model.

Optionally, the training the ground object segmentation model by using the training dataset to obtain a trained building segmentation model specifically includes:

for any training sample, inputting a training RS image of the training sample into the ground object segmentation model, and updating a model parameter of the ground object segmentation model by using a building segmentation label of the training sample as a target output.

Optionally, the method further includes the following steps:

obtaining a test dataset, where the test dataset includes multiple test samples, and the test sample includes a test RS image and a corresponding building segmentation label; and testing the trained ground object segmentation model by using the test dataset, and determining building segmentation precision of the trained ground object segmentation model.

Optionally, the ground object segmentation model includes an encoder and a decoder; the encoder and the decoder include the residual module; and the decoder includes an attention module.

Optionally, the encoder includes a first convolutional block, a second convolutional block, a third convolutional block, a fourth convolutional block, and a fifth convolutional block that are sequentially connected; the residual module includes a first residual block, a second residual block, a third residual block, and a fourth residual block; the first residual block is connected between the first convolutional block and the second convolutional block; the second residual block is connected between the second convolutional block and the third convolutional block; the third residual block is connected between the third convolutional block and the fourth convolutional block; and the fourth residual block is connected between the fourth convolutional block and the fifth convolutional block.

Optionally, the decoder includes a sixth convolutional block, a seventh convolutional block, an eighth convolutional block, and a ninth convolutional block that are sequentially connected; the attention module includes a mixed-domain attention block, a first cross-attention block, a second cross-attention block, a third cross-attention block, and a fourth cross-attention block; and the residual module further includes a fifth residual block, a sixth residual block, a seventh residual block, and an eighth residual block.

The fifth convolutional block is connected to the sixth convolutional block by using the mixed-domain attention block; the sixth convolutional block is connected to the seventh convolutional block by using the fifth residual block; the seventh convolutional block is connected to the eighth convolutional block by using the sixth residual block; the eighth convolutional block is connected to the ninth convolutional block by using the seventh residual block; and an output of the ninth convolutional block is output by using the eighth residual block.

The first cross-attention block splices an output of the fourth residual block to an output of the sixth convolutional block; the second cross-attention block splices an output of the third residual block to an output of the seventh convolutional block; the third cross-attention block splices an output of the second residual block to an output of the eighth convolutional block; and the fourth cross-attention block splices an output of the first residual block to the output of the ninth convolutional block.

In another aspect, the present disclosure provides a computer device, including a memory, a processor, and a computer program stored in the memory and executable on the processor, where the processor executes the computer program to implement the steps of the ground object segmentation method based on a residual module and an attention mechanism according to any one of the implementations.

In another aspect, the present disclosure provides a computer-readable storage medium, storing a computer program, and the computer program is executed by a processor to implement the steps of the ground object segmentation method based on a residual module and an attention mechanism according to any one of the implementations.

In another aspect, the present disclosure provides a computer program product, including a computer program, and the computer program is executed by a processor to implement the steps of the ground object segmentation method based on a residual module and an attention mechanism according to any one of the implementations.

According to specific embodiments provided in the present disclosure, the present disclosure has the following technical effects:

The present disclosure provides the ground object segmentation method based on a residual module and an attention mechanism, and a related apparatus. The method includes the following steps: obtaining a to-be-segmented RS image; and inputting the to-be-segmented RS image into a trained ground object segmentation model to obtain a ground object segmentation result, where the ground object segmentation model is a network model obtained based on a U-Net neural network and with reference to the residual module and an attention module. In the present disclosure, a U-Net model with reference to a residual network structure and the attention mechanism is used. A main idea is to avoid a degradation problem of a deep network model by using an improved residual structure. In addition, a hybrid attention mechanism and a cross-attention mechanism are introduced, so that the model has a capability of connecting long-distance context information. Therefore, global information of an image can be more fully utilized, and an adaptive capability of a network can be enhanced.

BRIEF DESCRIPTION OF THE DRAWINGS

To describe the technical solutions in embodiments of the present disclosure or in the conventional technology more clearly, the accompanying drawings required for the embodiments are briefly described below. Clearly, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings in the embodiments of the present disclosure. Clearly, the described embodiments are merely a part rather than all of the embodiments of the present disclosure. All other embodiments obtained by those skilled in the art based on the embodiments of the present disclosure without creative efforts shall fall within the protection scope of the present disclosure.

The present disclosure aims to provide a ground object segmentation method based on a residual module and an attention mechanism, and a related apparatus, to improve precision of performing ground object segmentation on an RS image.

To make the above objective, features and advantages of the present disclosure clearer and more comprehensible, the present disclosure will be further described in detail below in combination with accompanying drawings and specific implementations.

Embodiment 1

Figure 1:
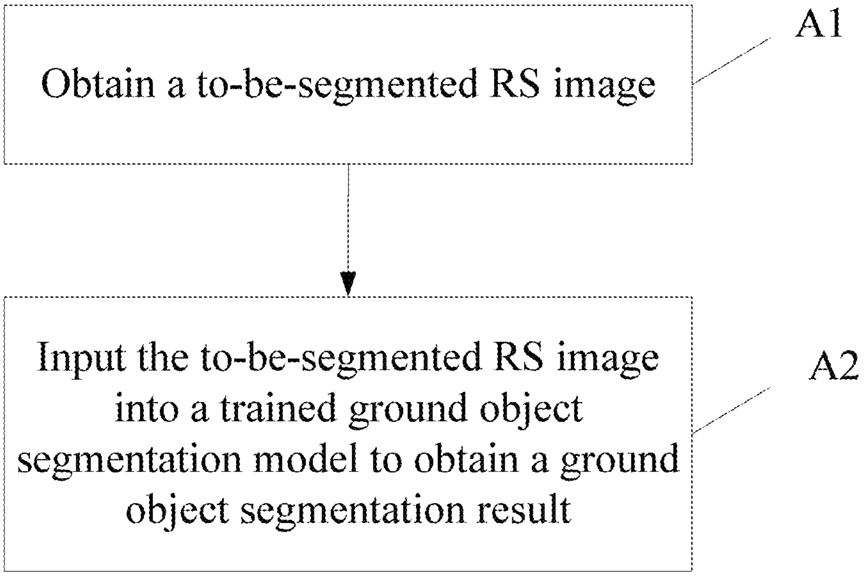
FIG. 1 is a flowchart of a ground object segmentation method based on a residual module and an attention mechanism according to Embodiment 1 of the present disclosure.

As shown in a flowchart in FIG. 1, a ground object segmentation method based on a residual module and an attention mechanism in this embodiment includes the following steps:

A1: Obtain a to-be-segmented RS image. The to-be-segmented RS image includes multiple buildings and ground areas.

A2: Input the to-be-segmented RS image into a trained ground object segmentation model to obtain a ground object segmentation result. The ground object segmentation result includes a building segmentation result, and the ground object segmentation model is a network model obtained based on a U-Net neural network and with reference to the residual module and an attention module.

Figure 2:
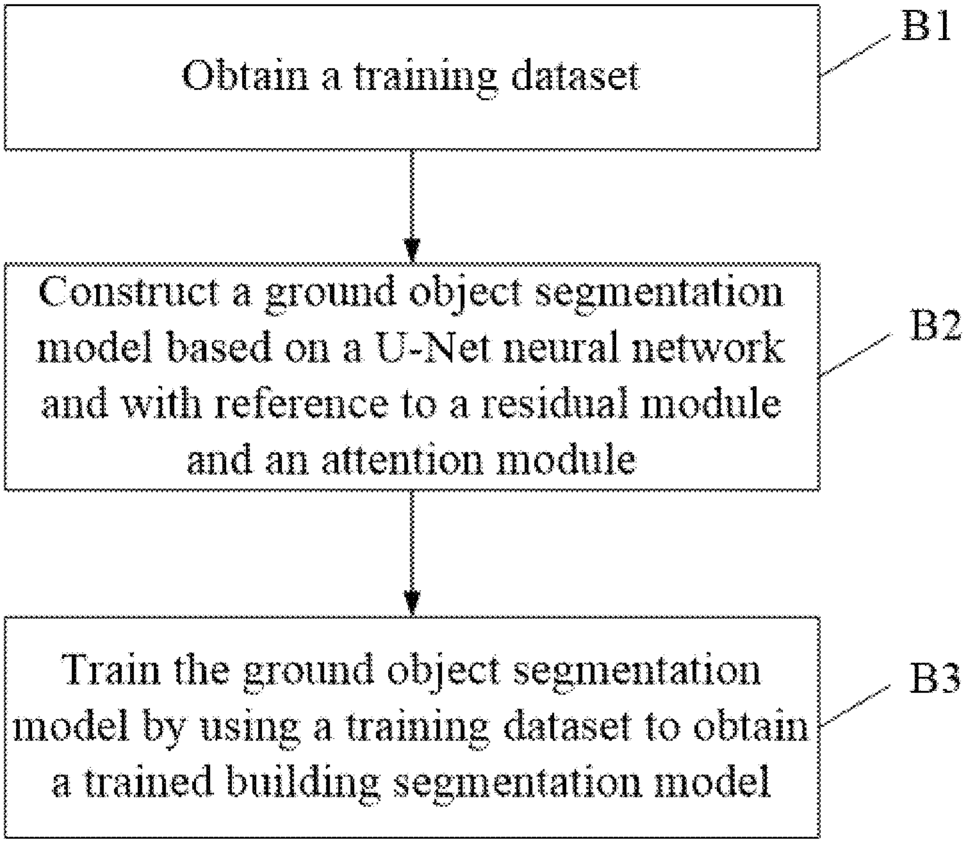
FIG. 2 is a flowchart of steps B1-B3 in a ground object segmentation method based on a residual module and an attention mechanism according to Embodiment 1 of the present disclosure.

Specifically, before the ground object segmentation model is used, the ground object segmentation model further needs to be constructed and trained. As shown in a flowchart in FIG. 2, the following steps are included:

B1: Obtain a training dataset. The training dataset includes multiple training samples, and the training sample includes a training RS image and a corresponding building segmentation label.

Figure 3:
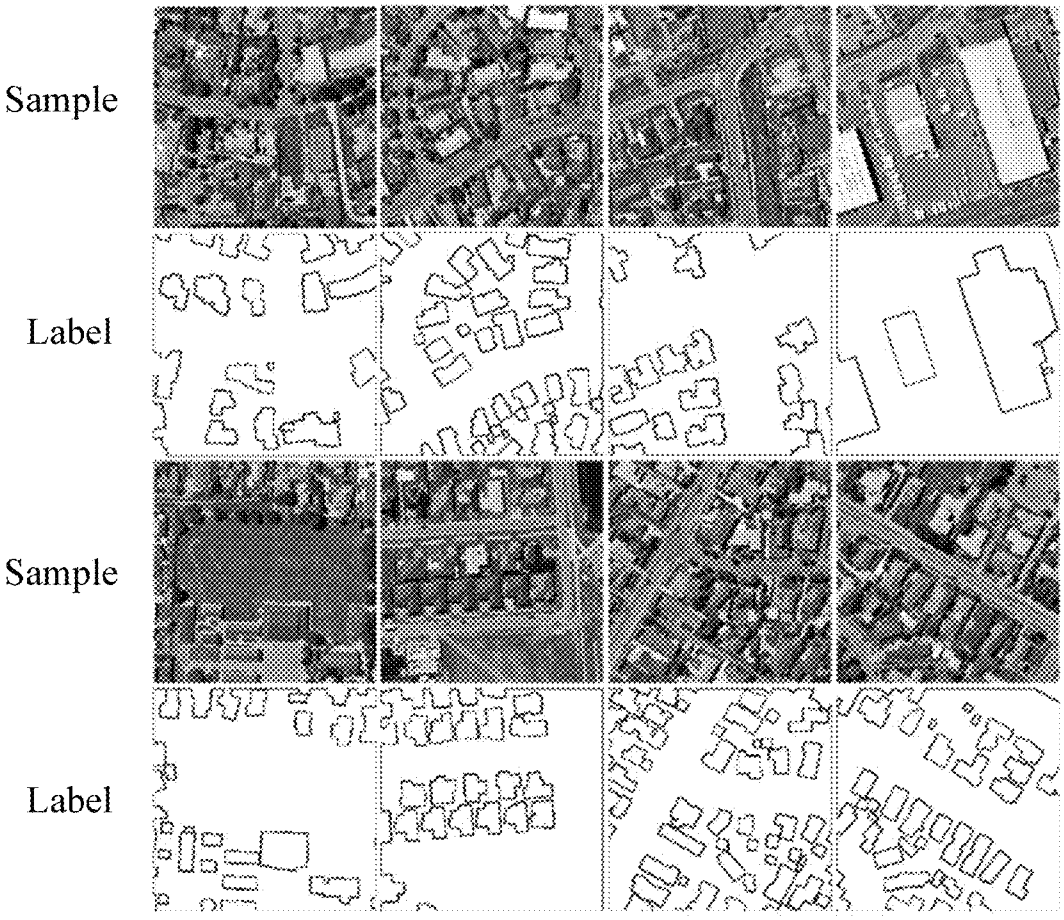
FIG. 3 is a schematic diagram of an Aerial imagery dataset in a building dataset in a ground object segmentation method based on a residual module and an attention mechanism according to Embodiment 1 of the present disclosure.

In this embodiment, a training dataset used to perform model training is from a Wuhan University (WHU) building semantic segmentation aerial imagery dataset. An Aerial imagery dataset in the WHU building semantic segmentation dataset is used, and 5000 image samples are randomly selected. An image size is 512×512 (pixels), and ground resolution is 0.3 m. As shown in FIG. 3, a white part is a building, a black part is a background, 80% samples are randomly selected as a training dataset, and 20% samples are randomly selected as a test dataset.

Figure 4:
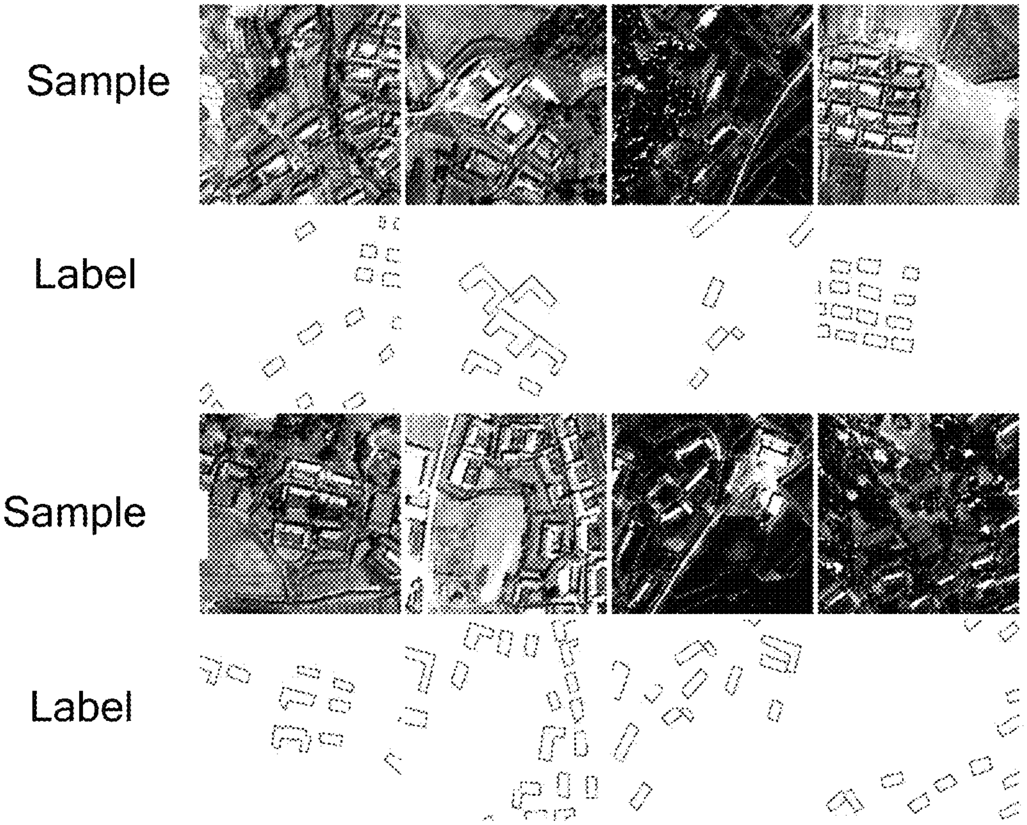
FIG. 4 is a schematic diagram of a Satellite dataset II in a building dataset in a ground object segmentation method based on a residual module and an attention mechanism according to Embodiment 1 of the present disclosure.

In another embodiment, a Satellite dataset II in the WHU building semantic segmentation dataset is used to construct a training dataset and a test dataset. In this case, 5000 image samples are randomly selected. An image size is 512×512 (pixels), and ground resolution is 0.45 m. As shown in FIG. 4, a white part is a building, a black part is a background, 80% samples are randomly selected as a training dataset, and 20% samples are randomly selected as a test dataset.

Figure 5:
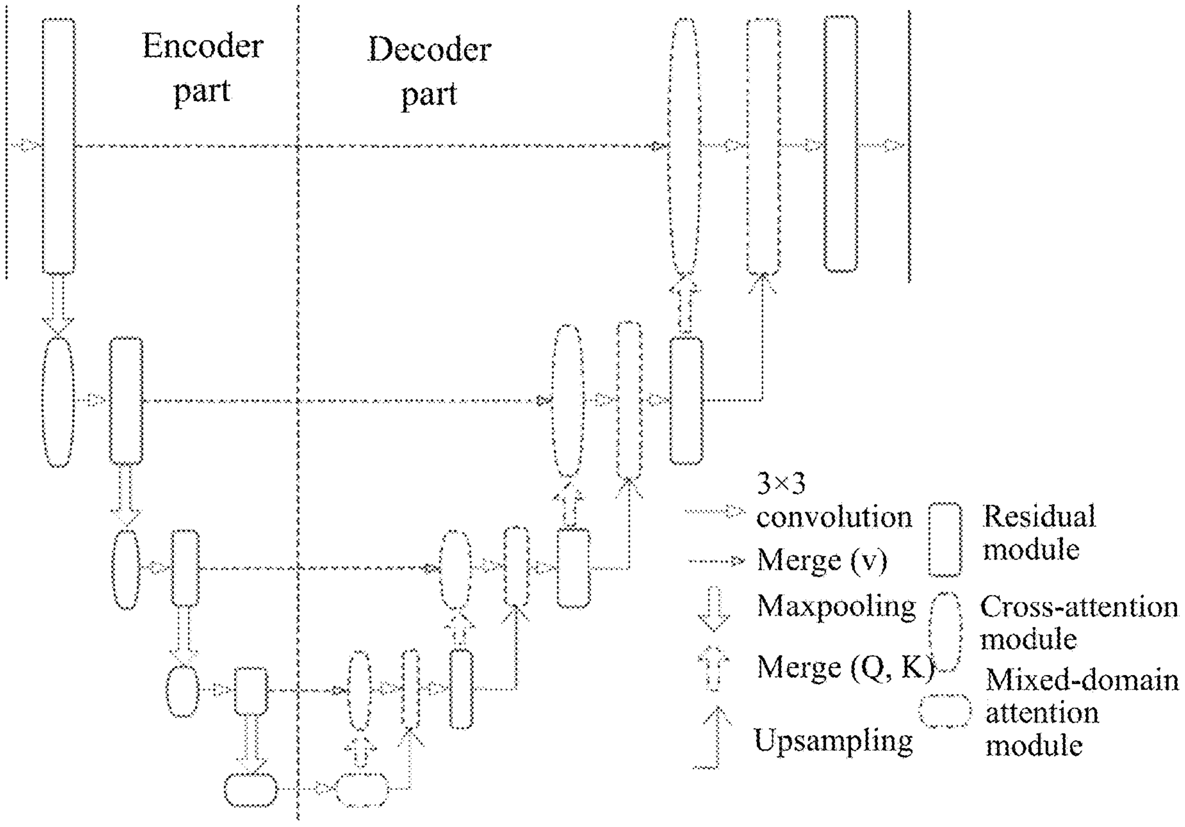
FIG. 5 is a schematic diagram of a structure of a ground object segmentation model in a ground object segmentation method based on a residual module and an attention mechanism according to Embodiment 1 of the present disclosure.

B2: Construct the ground object segmentation model based on the U-Net neural network and with reference to the residual module and the attention module. For a schematic diagram of a structure of a network model shown in FIG. 5, the ground object segmentation model includes an encoder and a decoder; the encoder and the decoder include the residual module; and the decoder includes an attention module.

The encoder includes a first convolutional block, a second convolutional block, a third convolutional block, a fourth convolutional block, and a fifth convolutional block that are sequentially connected; the residual module includes a first residual block, a second residual block, a third residual block, and a fourth residual block; the first residual block is connected between the first convolutional block and the second convolutional block; the second residual block is connected between the second convolutional block and the third convolutional block; the third residual block is connected between the third convolutional block and the fourth convolutional block; and the fourth residual block is connected between the fourth convolutional block and the fifth convolutional block.

Figure 6:
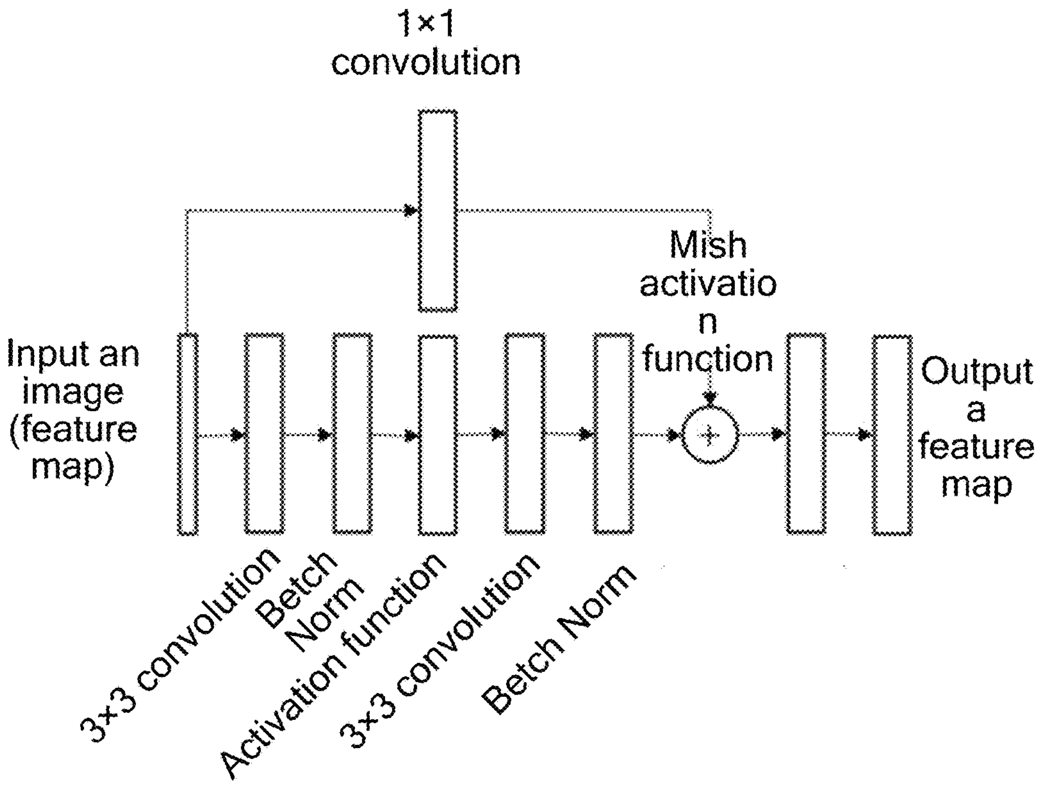
FIG. 6 is a schematic diagram of a structure of a residual convolutional module in a ground object segmentation method based on a residual module and an attention mechanism according to Embodiment 1 of the present disclosure.

Each residual convolutional module (adjacent convolutional blocks and residual blocks) in the encoder is followed by an average pooling layer. For a structure of a residual convolutional module shown in FIG. 6, a second activation function in a residual network is replaced with a Mish function by a Rectified Linear Unit (ReLU) function, which has a better generalization capability and a more efficient optimization capability. A residual block connection is added to a convolutional layer, so that original information of an input image is more retained and transmitted to a deeper layer of the network. When there are a very large quantity of layers of a convolutional neural network (CNN), a residual connection can resolve problems of gradient disappearance and gradient explosion, and can also resolve a problem of performance degradation when a quantity of layers of the network increases.

The decoder includes a sixth convolutional block, a seventh convolutional block, an eighth convolutional block, and a ninth convolutional block that are sequentially connected; the attention module includes a mixed-domain attention block, a first cross-attention block, a second cross-attention block, a third cross-attention block, and a fourth cross-attention block; and the residual module further includes a fifth residual block, a sixth residual block, a seventh residual block, and an eighth residual block.

Figure 7:
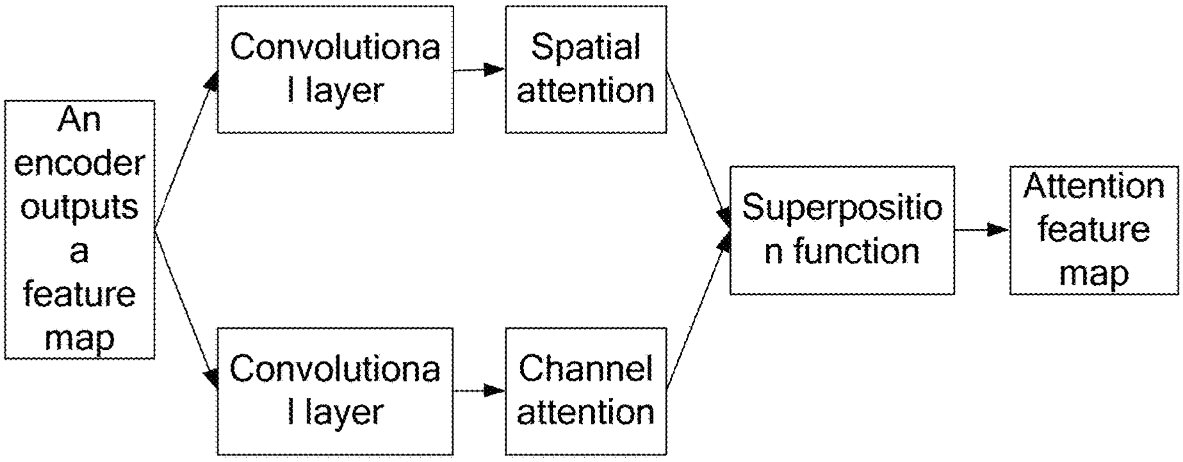
FIG. 7 is a schematic diagram of a structure of a mixed-domain attention block in a ground object segmentation method based on a residual module and an attention mechanism according to Embodiment 1 of the present disclosure.

As shown in the structure shown in FIG. 7, a mixed-domain attention block mainly includes two types of attention, namely, a spatial attention block and a channel attention block. The spatial attention block selectively aggregates each feature by assigning a weight to each location, and all similar features are correlated to each other. The channel attention block selectively emphasizes interdependent channel mapping by integrating relevant features between all channel mappings.

The fifth convolutional block is connected to the sixth convolutional block by using the mixed-domain attention block; the sixth convolutional block is connected to the seventh convolutional block by using the fifth residual block; the seventh convolutional block is connected to the eighth convolutional block by using the sixth residual block; the eighth convolutional block is connected to the ninth convolutional block by using the seventh residual block; and an output of the ninth convolutional block is output by using the eighth residual block.

The first cross-attention block splices an output of the fourth residual block to an output of the sixth convolutional block; the second cross-attention block splices an output of the third residual block to an output of the seventh convolutional block; the third cross-attention block splices an output of the second residual block to an output of the eighth convolutional block; and the fourth cross-attention block splices an output of the first residual block to the output of the ninth convolutional block.

B3: Train the ground object segmentation model by using the training dataset to obtain a trained building segmentation model. Specifically, step B3 includes the following steps:

for any training sample, inputting a training RS image of the training sample into the ground object segmentation model, and updating a model parameter of the ground object segmentation model by using a building segmentation label of the training sample as a target output.

The dataset obtained in step B1 is substituted into an improved U-Net model for training. In a model training process, an original image of the dataset obtained in step B1 is input, and a building segmentation image is output.

For a problem that a small sample size easily causes training over-fitting, a learning rate is dynamically adjusted by using a learning rate attenuation method, to prevent over-fitting and ensure a specified learning rate. An optimizer uses Adaptive Moment Estimation (Adam), a loss function uses a binary cross-entropy loss (BCE Loss) function, a quantity of iterations (Epoch) is set to 50, a batch processing quantity (Batch Size) is set to 2, and an initial learning rate is set to 0.001. The loss function BCE Loss may be calculated according to the following formula:

$$L=-(y \log(p)+(1-y)\log(1-p)),\text{ where}$$

L is a value of the cross-entropy loss function, y is a real label (0 or 1), and p is a probability that the model predicts a positive class.

A tested computer hardware environment is an i7-5930K processor, a 64 GB running memory and a Tesla-V100 graphics card with a 32 GB video memory. A software environment is a 64-bit Windows 10 operating system and a Pytorch deep learning framework.

After the ground object segmentation model is trained, the following steps are further included:

C1: Obtain a test dataset, where the test dataset includes multiple test samples, and the test sample includes a test RS image and a corresponding building segmentation label.

C2: Test the trained ground object segmentation model by using the test dataset, and determine building segmentation precision of the trained ground object segmentation model.

Advantages of the solutions of the present disclosure are proved by comparing segmentation recognition precision of a conventional U-Net network model, a Residual U-Net (ResU-Net) network model with only a residual module added, and a ResU-Net+Attention network model with a residual module added and an attention module added. A comparison result is shown in Table 1. It can be learned from Table 1 that the overall segmentation precision of the ResU-Net network model increases from 90.61% of U-Net to 92.35%, and an F1 value also increases from 86.13% to 87.07%. It can be seen that the residual module can effectively improve segmentation precision. An attention module in ResU-Net+Attention can distinguish similar objects more accurately. The overall precision of the model is further improved from 92.35% to 94.33%, and an F1 value is also improved from 87.07% to 88.93%.

TABLE 1

Comparison result of segmentation precision of different improved models

| Model | Precision | Recall rate | F1 | Overall precision | Intersection over Union (IoU) |
|---|---|---|---|---|---|
| U-Net | 85.73 | 84.23 | 86.13 | 90.61 | 76.95 |
| ResU-Net | 86.97 | 85.63 | 87.07 | 92.35 | 78.45 |
| ResU-Net + Attention | 89.04 | 86.76 | 88.93 | 94.33 | 81.16 |

The improved ResU-Net+Attention convolutional network model proposed in the present disclosure is separately applied to the Satellite dataset II and the Aerial imagery dataset of the WHU building dataset. A comparison result of segmentation precision of different datasets is shown in Table 2. An average F1 value of the improved model is 88.48%, and average overall precision is 93.82%. It can be seen that the model has good reliability and precision for segmenting a single ground object of an RS image.

TABLE 2

Comparison result of segmentation precision of different datasets

| Dataset | Precision | Recall rate | F1 | Overall precision | IoU |
|---|---|---|---|---|---|
| Satellite dataset II | 87.89 | 86.11 | 88.03 | 93.31 | 79.64 |
| Aerial imagery dataset | 89.04 | 86.76 | 88.93 | 94.33 | 81.16 |

This embodiment provides the ground object segmentation method based on a residual module and an attention mechanism, including: obtaining a to-be-segmented RS image; and inputting the to-be-segmented RS image into a trained ground object segmentation model to obtain a ground object segmentation result, where the ground object segmentation model is a network model obtained based on a U-Net neural network and with reference to the residual module and an attention module. In this embodiment, the U-Net model with reference to a residual network structure and the attention mechanism is used. A main idea is to avoid a degradation problem of a deep network model by using an improved residual structure. In addition, a hybrid attention mechanism and a cross-attention mechanism are introduced, so that the model has a capability of connecting long-distance context information. Therefore, global information of an image can be more fully utilized, and an adaptive capability of a network can be enhanced.

Embodiment 2

A computer-readable storage medium stores a computer program, and the computer program is executed by a processor to implement the steps of the ground object segmentation method based on a residual module and an attention mechanism in Embodiment 1.

Embodiment 3

A computer program product includes a computer program, and the computer program is executed by a processor to implement the steps of the ground object segmentation method based on a residual module and an attention mechanism in Embodiment 1.

Embodiment 4

Figure 8:
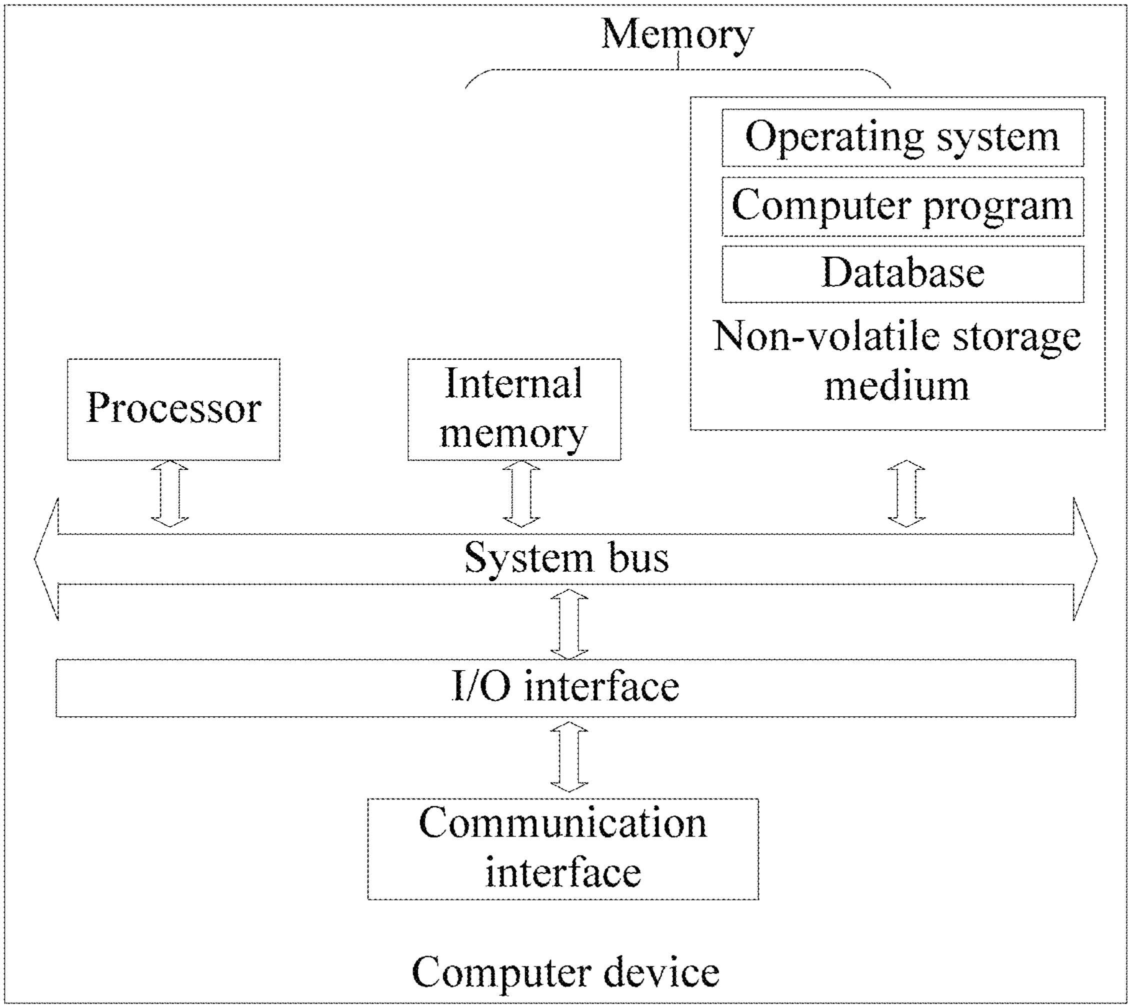
FIG. 8 is a diagram of an internal structure of a computer device according to Embodiment 4 of the present disclosure.

A computer device is provided. The computer device may be a database, and a diagram of an internal structure of the computer device may be shown in FIG. 8. The computer device includes a processor, a memory, an input/output (I/O) interface, and a communication interface. The processor, the memory, and the I/O interface are connected by using a system bus, and the communication interface is connected to the system bus by using the I/O interface. The processor of the computer device is configured to provide computing and control capabilities. The memory of the computer device includes a non-volatile storage medium and an internal memory. The non-volatile storage medium stores an operating system, a computer program, and a database. The internal memory provides an environment for operations of the operating system and the computer program in the non-volatile storage medium. The database of the computer device is configured to store to-be-processed transaction. The I/O interface of the computer device is configured to exchange information between the processor and an external device. The communication interface of the computer device is configured to connect to and communicate with an external terminal through a network. The computer program is executed by the processor to implement the ground object segmentation method based on a residual module and an attention mechanism in Embodiment 1.

It should be noted that object information (including but not limited to object device information, object personal information, and the like) and the data (including but not limited to data used for analysis, stored data, displayed data, and the like) included in the present disclosure are information and data that are authorized by an object or that are fully authorized by each party. In addition, collection, use, and processing of relevant data need to comply with relevant laws, regulations, and standards of relevant countries and regions.

Those of ordinary skill in the art may understand that all or some of the procedures in the method of the foregoing embodiments may be implemented by a computer program instructing related hardware. The computer program may be stored in a non-volatile computer-readable storage medium. When the computer program is executed, the procedures in the embodiments of the foregoing method may be performed. Any reference to a memory, a database, or other media used in the embodiments of the present disclosure may include at least one of a non-volatile memory and a volatile memory. The non-volatile memory may include a read-only memory (ROM), a magnetic tape, a floppy disk, a flash memory, an optical memory, a high-density embedded non-volatile memory, a Resistive Random Access Memory (ReRAM), a Magnetoresistive Random Access Memory (MRAM), a Ferroelectric Random Access Memory (FRAM), a Phase Change Memory (PCM), a graphene memory, and the like. The volatile memory may include a random access memory (RAM) or an external cache memory. As an illustration rather than a limitation, the RAM may be in various forms, such as a static random access memory (SRAM) or a dynamic random access memory (DRAM). The databases included in the embodiments provided in the present disclosure may include at least one of a relational database and a non-relational database. The non-relational database may include a block-chain-based distributed database and the like, which is not limited thereto. The processor in the embodiments provided in the present disclosure may be a general-purpose processor, a central processing unit (CPU), a graphics processing unit (GPU), a digital signal processor (DSP), a programmable logic device (PLD), a quantum computing-based data processing logic device, and the like, which is not limited thereto.

The technical features in the foregoing embodiments may be combined randomly. To make the description brief, not all possible combinations of the technical features in the foregoing embodiments are described. However, as long as there is no contradiction between the combinations of the technical features, the combinations of the technical features should be considered to fall within the scope described in this specification.

Specific examples are used in the specification for illustration of principles and implementations of the present disclosure. The descriptions of the above embodiments are merely used for assisting in understanding the method of the present disclosure and its core ideas. In addition, those of ordinary skill in the art can make modifications in terms of specific implementations and an application scope in accordance with the ideas of the present disclosure. In conclusion, the content of the specification shall not be construed as limitations to the present disclosure.

What is claimed is:

1. A ground object segmentation method based on a residual module and an attention mechanism, comprising:

obtaining a to-be-segmented remote sensing (RS) image, wherein the to-be-segmented RS image comprises multiple buildings and ground areas; and inputting the to-be-segmented RS image into a trained ground object segmentation model to obtain a ground object segmentation result, wherein the ground object segmentation result comprises a building segmentation result, and the ground object segmentation model is a network model obtained based on a U-Net neural network and with reference to the residual module and an attention module, wherein:

the ground object segmentation model comprises an encoder and a decoder; the encoder and the decoder comprise the residual module; and the decoder comprises the attention module, the encoder comprises a first convolutional block, a second convolutional block, a third convolutional block, a fourth convolutional block, and a fifth convolutional block that are sequentially connected; the residual module comprises a first residual block, a second residual block, a third residual block, and a fourth residual block; the first residual block is connected between the first convolutional block and the second convolutional block; the second residual block is connected between the second convolutional block and the third convolutional block; the third residual block is connected between the third convolutional block and the fourth convolutional block; and the fourth residual block is connected between the fourth convolutional block and the fifth convolutional block, the decoder comprises a sixth convolutional block, a seventh convolutional block, an eighth convolutional block, and a ninth convolutional block that are sequentially connected; the attention module comprises a mixed-domain attention block, a first cross-attention block, a second cross-attention block, a third cross-attention block, and a fourth cross-attention block; and the residual module further comprises a fifth residual block, a sixth residual block, a seventh residual block, and an eighth residual block the fifth convolutional block is connected to the sixth convolutional block by using the mixed-domain attention block; the sixth convolutional block is connected to the seventh convolutional block by using the fifth residual block; the seventh convolutional block is connected to the eighth convolutional block by using the sixth residual block; the eighth convolutional block is connected to the ninth convolutional block by using the seventh residual block; and an output of the ninth convolutional block is output by using the eighth residual block; and the first cross-attention block splices an output of the fourth residual block to an output of the sixth convolutional block; the second cross-attention block splices an output of the third residual block to an output of the seventh convolutional block; the third cross-attention block splices an output of the second residual block to an output of the eighth convolutional block; and the fourth cross-attention block splices an output of the first residual block to the output of the ninth convolutional block.

2. The ground object segmentation method based on a residual module and an attention mechanism according to claim 1, further comprising:

obtaining a training dataset, wherein the training dataset comprises multiple training samples, and the training sample comprises a training RS image and a corresponding building segmentation label;

constructing the ground object segmentation model based on the U-Net neural network and with reference to the residual module and the attention module; and training the ground object segmentation model by using the training dataset to obtain a trained building segmentation model.

3. The ground object segmentation method based on a residual module and an attention mechanism according to claim 2, wherein the training the ground object segmentation model by using the training dataset to obtain a trained building segmentation model specifically comprises:

for any training sample, inputting a training RS image of the training sample into the ground object segmentation model, and updating a model parameter of the ground object segmentation model by using a building segmentation label of the training sample as a target output.

4. The ground object segmentation method based on a residual module and an attention mechanism according to claim 1, further comprising:

obtaining a test dataset, wherein the test dataset comprises multiple test samples, and the test sample comprises a test RS image and a corresponding building segmentation label; and testing the trained ground object segmentation model by using the test dataset, and determining building segmentation precision of the trained ground object segmentation model.

5. A computer device, comprising a memory, a processor, and a computer program stored in the memory and executable on the processor, wherein the processor executes the computer program to implement the steps of the ground object segmentation method based on a residual module and an attention mechanism according to claim 1.

6. A non-transitory computer-readable storage medium, storing a computer program, wherein the computer program is executed by a processor to implement the steps of the ground object segmentation method based on a residual module and an attention mechanism according to claim 1.

7. The computer device according to claim 5, further comprising:

obtaining a training dataset, wherein the training dataset comprises multiple training samples, and the training sample comprises a training RS image and a corresponding building segmentation label;

constructing the ground object segmentation model based on the U-Net neural network and with reference to the residual module and the attention module; and training the ground object segmentation model by using the training dataset to obtain a trained building segmentation model.

8. The computer device according to claim 7, wherein the training the ground object segmentation model by using the training dataset to obtain a trained building segmentation model specifically comprises:

for any training sample, inputting a training RS image of the training sample into the ground object segmentation model, and updating a model parameter of the ground object segmentation model by using a building segmentation label of the training sample as a target output.

9. The computer device according to claim 5, further comprising:

obtaining a test dataset, wherein the test dataset comprises multiple test samples, and the test sample comprises a test RS image and a corresponding building segmentation label; and testing the trained ground object segmentation model by using the test dataset, and determining building segmentation precision of the trained ground object segmentation model.

10. The non-transitory computer-readable storage medium according to claim 9, further comprising:

obtaining a training dataset, wherein the training dataset comprises multiple training samples, and the training sample comprises a training RS image and a corresponding building segmentation label;

constructing the ground object segmentation model based on the U-Net neural network and with reference to the residual module and the attention module; and training the ground object segmentation model by using the training dataset to obtain a trained building segmentation model.

11. The non-transitory computer-readable storage medium according to claim 10, wherein the training the ground object segmentation model by using the training dataset to obtain a trained building segmentation model specifically comprises:

for any training sample, inputting a training RS image of the training sample into the ground object segmentation model, and updating a model parameter of the ground object segmentation model by using a building segmentation label of the training sample as a target output.

12. The non-transitory computer-readable storage medium according to claim 6, further comprising:

obtaining a test dataset, wherein the test dataset comprises multiple test samples, and the test sample comprises a test RS image and a corresponding building segmentation label; and testing the trained ground object segmentation model by using the test dataset, and determining building segmentation precision of the trained ground object segmentation model.

* * * * *